United States Patent
Cartmell et al.

(10) Patent No.: US 7,474,944 B2
(45) Date of Patent: Jan. 6, 2009

(54) CONTROL SYSTEM AND METHOD WITH MULTIPLE LINKED INPUTS

(75) Inventors: Daniel H. Cartmell, Bellevue, WA (US); Edward E. Coleman, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 619 days.

(21) Appl. No.: 11/099,684

(22) Filed: Apr. 4, 2005

(65) Prior Publication Data

US 2005/0234607 A1 Oct. 20, 2005

Related U.S. Application Data

(63) Continuation of application No. 10/279,092, filed on Oct. 22, 2002, now abandoned.

(51) Int. Cl.
B64C 13/00 (2006.01)
B64C 19/00 (2006.01)

(52) U.S. Cl. .................. 701/3; 701/4; 701/5; 701/8; 244/75.1; 244/221; 244/234

(58) Field of Classification Search ............... 701/3, 701/4, 8; 244/221, 175, 177, 181, 17.3, 4 R, 244/24, 75.1; 73/862.01, 862.05, 862.041
See application file for complete search history.

(56) References Cited

U.S. PATENT DOCUMENTS 3,719,336 A * 3/1973 Fowler et al. ............... 244/194

3,733,039 A * 5/1973 O'Connor et al. ........... 244/181

(Continued)

FOREIGN PATENT DOCUMENTS

DE 3275658 G * 4/1987

(Continued)

OTHER PUBLICATIONS

On the Kinematic Analysis and Design of a Redundant Manipulator for a Captive Trajectory Simulation System (CTS); Guigue, A.; Ahmadi, M.; Tang, F.C.; Electrical and Computer Engineering, 2006. CCECE '06. Canadian Conference on; May 2006 pp. 1514-1517; Digital Object Identifier 10.1109/CCECE.2006.277725.*

(Continued)

*Primary Examiner*—Cuong H Nguyen
(74) *Attorney, Agent, or Firm*—Perkins Coie LLP

(57) ABSTRACT

Methods and systems for linking input control signals, such as control signals used to control aspects of aircraft operation. In one embodiment, the method includes receiving first and second force signals corresponding to first and second forces applied to first and second controllers. The method can further include directing first and second position signals to the first and second controllers to move the first and second controllers to approximately the same positions. Each force signal is transmitted along a signal path, and the signal paths can be linked at a point where the signals on each path correspond to a quantity other that a position of a controller. The signal paths can be linked such that only one of the forces must exceed a threshold value for both controllers to be moved, and if one of the forces is outside a selected limit range, that force can be at least partially discounted.

35 Claims, 11 Drawing Sheets

U.S. PATENT DOCUMENTS

| | | | |
|---|---|---|---|
| 3,748,749 A | | 7/1973 | Buscher et al. |
| 3,991,486 A | * | 11/1976 | Derderian et al. ............ 434/220 |
| 4,067,517 A | * | 1/1978 | Barnum .................... 244/17.13 |
| 4,382,281 A | | 5/1983 | Fowler |
| 4,484,283 A | * | 11/1984 | Verzella et al. ................. 701/4 |
| 4,825,375 A | | 4/1989 | Nadkarni et al. ................ 701/3 |
| 5,076,517 A | | 12/1991 | Ferranti |
| 5,123,610 A | * | 6/1992 | Oaks .......................... 244/3.12 |
| 5,291,113 A | | 3/1994 | Hegg |
| 5,522,568 A | * | 6/1996 | Kamen et al. ............. 244/17.13 |
| 5,806,805 A | * | 9/1998 | Elbert et al. ................. 244/195 |
| 5,820,071 A | * | 10/1998 | Cross ....................... 244/17.13 |
| 6,359,601 B1 | * | 3/2002 | Maguire, Jr. .................... 345/7 |
| 6,459,228 B1 | | 10/2002 | Szulyk et al. |
| 6,711,476 B2 | * | 3/2004 | Jones et al. ..................... 701/3 |
| 6,981,409 B2 | * | 1/2006 | Huynh .................... 73/170.02 |
| 2004/0078121 A1 | * | 4/2004 | Cartmell et al. ................ 701/3 |
| 2005/0234607 A1 | * | 10/2005 | Cartmell et al. ................ 701/3 |

FOREIGN PATENT DOCUMENTS

| | | | | |
|---|---|---|---|---|
| EP | | 77504 A | * | 4/1983 |
| JP | | 03137500 A | * | 6/1991 |
| NO | | 301140 B1 | * | 9/1997 |

OTHER PUBLICATIONS

Stabilization and location of a four rotor helicopter applying vision; Romero, H.; Benosman, R.; Lozano, R.;American Control Conference, 2006, Jun. 14-16, 2006 pp. 6 pp., Digital Object Identifier 10.1109/ACC.2006.1657332.*

2nd Joint IEEE International Workshop on Visual Surveillance and Performance Evaluation of Tracking and Surveillance (VS-PETS); Research in Microelectronics and Electronics, 2005 PhD; vol. 1, Jul. 25-28, 2005 pp. 241-611; Digital Object Identifier 10.1109/RME.2005.1543049.*

APMIR: an airborne polarimeter designed for high accuracy; Bobak, J.P.; Hicks, B.C.; Rose, L.A.; McGlothlin, N.R.; Quinn, S.R.; Dowgiallo, D.J.; vonRentzell, T.E.; Oceans 2003. Proceedings; vol. 1, 2003 pp. 211-216 vol. 1; Digital Object Identifier 10.1109/Oceans.2003.178555.*

Tailless aircraft control law design using dynamic inversion & μ-synthesis; Ngo, A.D.; Reigelsperger, W.C.; Banda, S.S.; Bessolo, J.A.; Control Applications, 1996., Proceedings of the 1996 IEEE International Conference on; Sep. 15-18, 1996 pp. 107-112; Digital Object Identifier 10.1109/CCA.1996.558615.*

RAMOS near term observations; Beeler, C.J.; Humphrey, C.H.; LePage, A.J.; Pitkanen, M.E.; Shepherd, O.; Tilton, B.; Aerospace Applications Conference, 1996. Proceedings., 1996 IEEE; vol. 3, Feb. 3-10, 1996 pp. 75-88 vol. 3 Digital Object Identifier 10.1109/AERO.1996.496055.*

Operator interface testing of a space telerobotic system; Sorenson, E.A.; Akin, D.L.; Systems, Man and Cybernetics, 1995. Intelligent Systems for the 21st Century., IEEE International Conference on; vol. 5, Oct. 22-25, 1995 pp. 4065-4072 vol. 5; Digital Object Identifier 10.1109/ICSMC.1995.538427.*

* cited by examiner

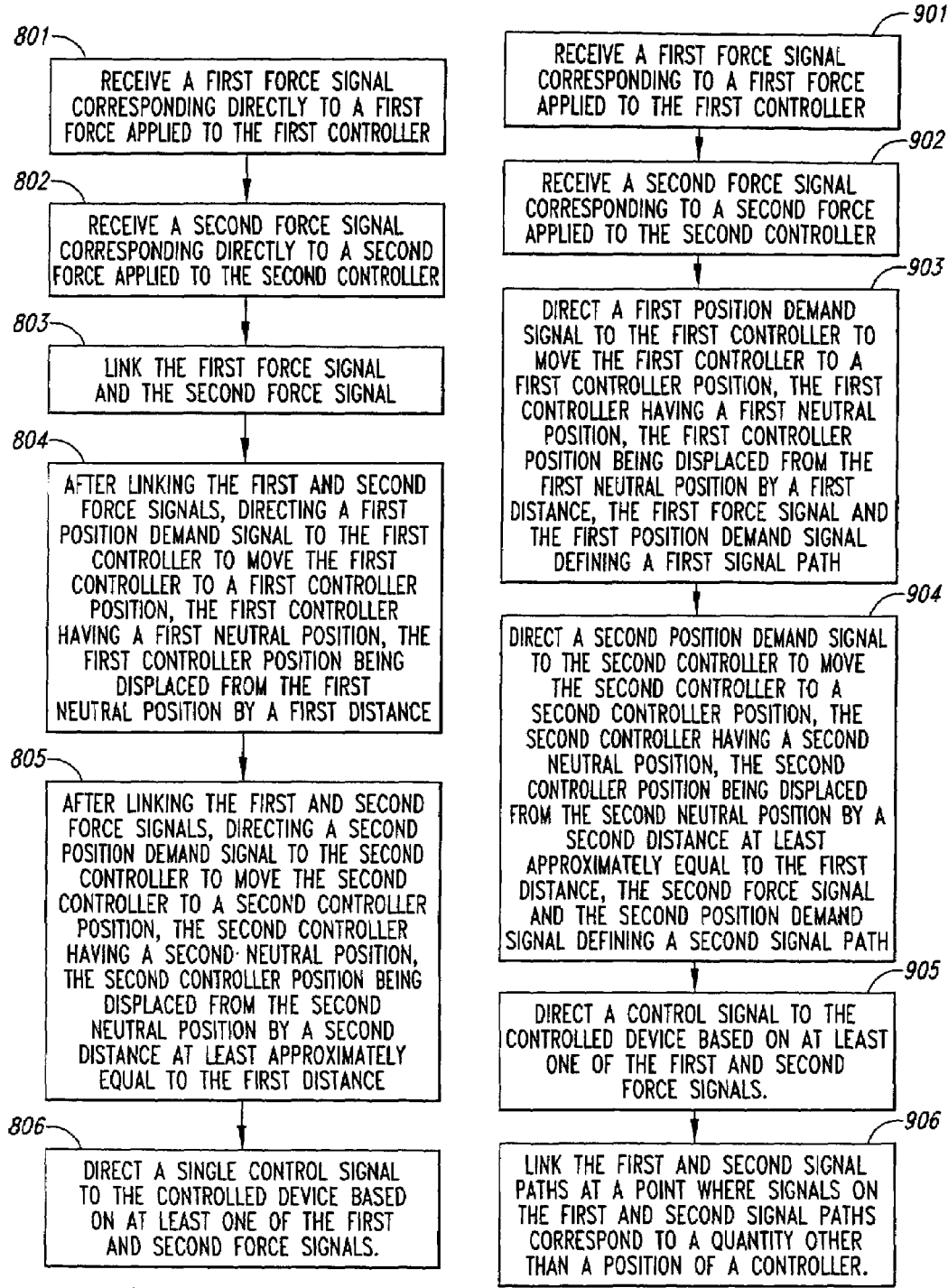

CONTROL SYSTEM AND METHOD WITH MULTIPLE LINKED INPUTS

CROSS-REFERENCE TO RELATED APPLICATIONS

This application is a continuation of U.S. application Ser. No. 10/279,092, filed Oct. 22, 2002 now abandoned.

TECHNICAL FIELD

The present invention relates generally to control systems and methods having linked inputs, such as aircraft control systems with linked left and right pilot inputs.

BACKGROUND

Early commercial aircraft include two sets of mechanically linked controls for pilots sitting in the left and right (or front and back) seats of the flight deck. These mechanical control systems include cables connected between the pilots' controllers and the aircraft control surfaces, such as the aircraft ailerons and elevators. The controllers for the two pilots are mechanically linked so that each pilot feels the effect of the other pilot's input, and the resultant force applied to the control surfaces corresponds to the sum of the forces applied by each pilot.

More modern aircraft and aircraft flight simulators include fly-by-wire systems in which the controller position or the force each pilot applies to a controller, such as a yoke or control stick, is translated into an electrical signal which directs a servo actuator to move the aircraft control surface. A servo motor coupled to the controller moves the controller to a position that corresponds to the amount of force applied by the pilot. The motor also provides resistance to the pilot's force on the controller. In one conventional arrangement shown in FIG. 1A, a system 140 includes a dynamic response model 141 that receives an input pilot force signal F and outputs a controller position demand signal D. A servo motor system 170 receives the position demand signal D and actuates the controller, moving it to position P. A summing junction 144 provides a feedback loop that accounts for friction (calculated by a friction model 142) and controller feel (calculated by a feel profile module 143) to produce characteristics at the controller that mimic those produced by a mechanical system.

FIG. 1B illustrates a typical feel profile which illustrates feedback force as a function of position for a typical feel profile module 143. The feedback force (i.e., the resistance the pilot feels when exerting a force on the controller to change a position of the controller) increases rapidly for small deflections, until the pilot surpasses a breakout point 123. The profile then has a generally smooth, curved shape until the pilot approaches a stop point 124, beyond which any additional attempts to change the controller position result in a very large feedback force.

FIG. 2A illustrates another existing system 240 that receives the pilot force input signal F, applies an inverse feel profile model 243 to produce a static controller position, then applies a second order dynamic response model 241 to produce the final controller position demand signal D. FIG. 2B illustrates an associated inverse feel profile curve having a breakout point 223 and a stop point 224.

One challenge associated with fly-by-wire systems has been to link the controllers for left and right seat pilots in a manner that simulates a mechanical system. For example, FIG. 3 illustrates an existing arrangement having linked control modules 360 (shown as a left control module 360a and a right control module 360b). Each control module 360 receives an input force signal F, applies a dynamic response model 341, provides feedback generated by a friction model 342 and a feel profile model 343 and implemented by a summing junction 344 to produce a corresponding controller position demand signal D. Each control module 360 further includes a linking function 345 that inputs the output controller position demand signals and provides additional feedback via the summing junction 344.

FIG. 4 schematically illustrates yet another existing arrangement having dual control modules 460 (shown as modules 460a and 460b) that each receive a pilot force input F and, via a lookup table 446, produce a position demand signal 452, which corresponds to a static position for the corresponding controller. The position demand signals 452 are linked via linking functions 445 and the resulting signals are passed to stick systems 441 which actuate the controllers to position P. Systems having an arrangement generally similar to that shown in FIG. 4 are available from Stirling Dynamics, Ltd. of Clifton, Bristol, England.

One drawback with at least some of the foregoing systems is that they may not accurately simulate the feel and behavior of mechanically linked pilot controls. For example, some of the foregoing systems may not accurately simulate the feel that one pilot has upon seizing the controls when the other pilot has already exceeded the breakout point. Furthermore, these foregoing systems may not accurately simulate the result obtained when two pilots provide large, opposite inputs. Yet another drawback with some of the foregoing systems is that they may not be versatile enough to allow the simulated link between pilot input forces to be easily updated to take advantage of simulation improvements.

SUMMARY

The present invention is directed to methods and systems for linking input control signals, such as control signals used to control aspects of aircraft operation. A computer-implemented method in accordance with one aspect of the invention includes receiving a first force signal corresponding to a first force applied to a first controller, and receiving a second force signal corresponding to a second force applied to a second controller. The method further includes directing a first position demand signal to the first controller to move the first controller to a first controller position, wherein the first controller has a first neutral position and the first controller position is displaced from the neutral position by a first distance, and wherein the first force signal and the first position signal are transmitted along a first signal path. The method can further include directing a second position demand signal to the second controller to move the second controller to a second controller position, wherein the second controller has a second neutral position and the second controller position is displaced from the second neutral position by a second distance at least approximately equal to the first distance, and wherein the second force signal and the second position signal are transmitted along a second signal path. A control signal is then directed to a control device based on at least one of the first and second force signals, and the first and second signal paths are linked at a point where the signals on the first and second signal paths correspond to a quantity other than a position of a controller.

A computer-implemented method in accordance with another aspect of the invention includes receiving a first force signal corresponding to a first force applied to the first controller and receiving a second force signal corresponding to a second force applied to the second controller. The method further includes (if the first force signal meets or exceeds a threshold value), directing a first position demand signal to the first controller to move the first controller to a first controller position, and directing a second position demand signal to the second controller to move the second controller to a second controller position independent of whether or not the second force signal meets or exceeds the threshold value. The first controller position is displaced from a first neutral position by a first distance and the second controller position is displaced from a second neutral position by a second distance at least approximately equal to the first distance. The method further includes directing a control signal based on at least one of the first and second signals.

A computer-implemented method in accordance with yet another aspect of the invention includes receiving a first force signal corresponding to a first force applied to the first controller and receiving a second force signal corresponding to a second force applied to the second controller. If the first force signal is less than a selected limit value, the method further includes directing a first control signal corresponding to a combination of the first and second force signals. If the force signal exceeds the selected limit value, the method further includes directing a second control signal that at least partially discounts the first force signal.

The foregoing computer-implemented methods can be performed by computer-readable media in further aspects of the invention. In yet a further aspect of the invention, the computer-readable media performing any of the foregoing methods can form a portion of a system that includes the first and second controllers.

BRIEF DESCRIPTION OF THE DRAWINGS

FIG. 8 is a block diagram illustrating a method in accordance with an embodiment of the invention.

FIG. 9 is a block diagram illustrating a method in accordance with another embodiment of the invention.

DETAILED DESCRIPTION

The present disclosure describes systems and methods for providing linked controls to devices such as aircraft flight control surfaces. Many specific details of certain embodiments of the invention are set forth in the following description and in FIGS. 5-13 to provide a thorough understanding of these embodiments. One skilled in the art, however, will understand that the present invention may have additional embodiments, and that the invention may be practiced without several of the details described below.

Figure 5:
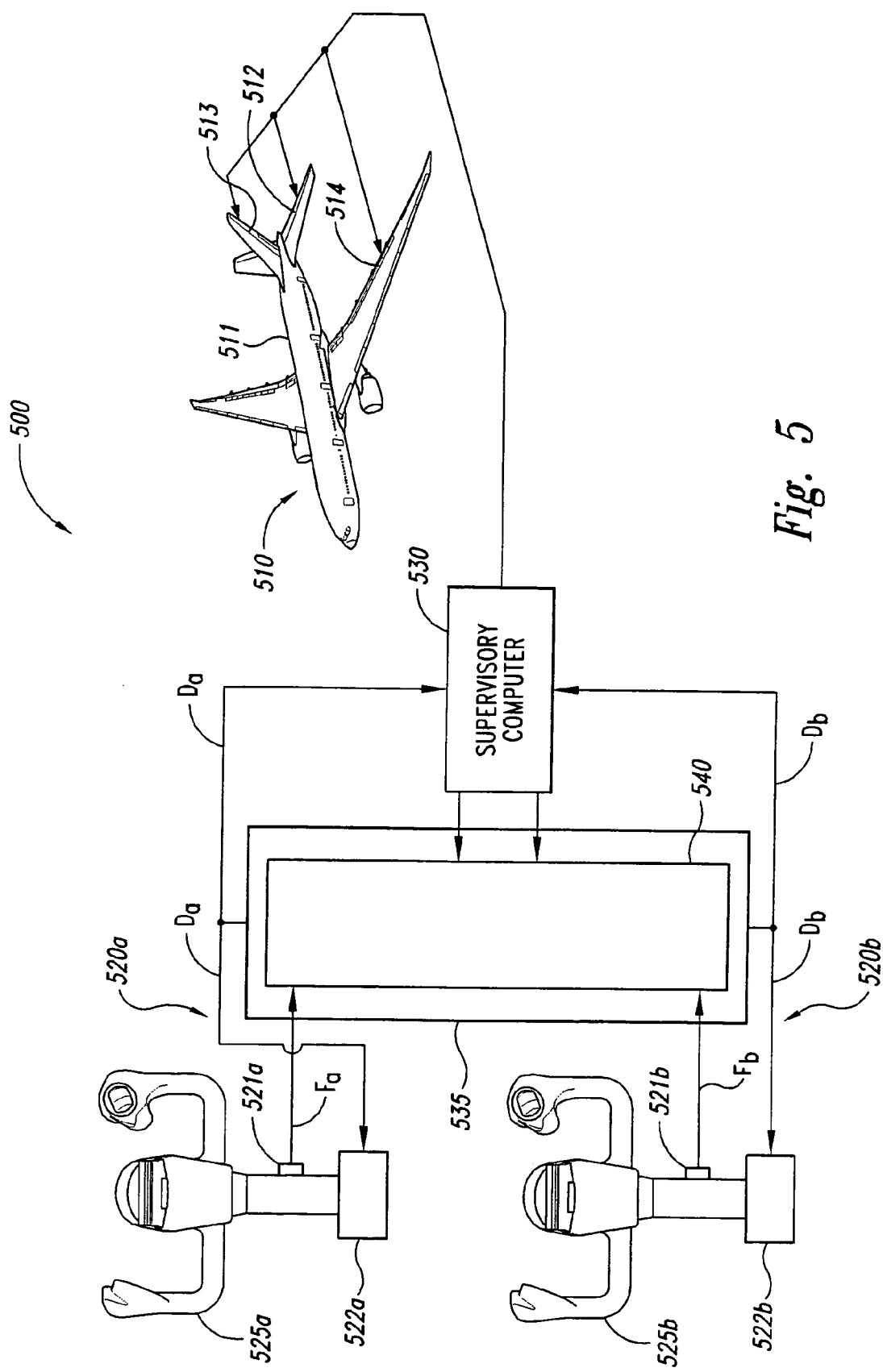
FIG. 5 illustrates a system having controllers linked to a controlled device in accordance with an embodiment of the invention.

FIG. 5 is a schematic illustration of a system 500, such as a linked active feel system, having a plurality of controllers 520 (two are shown in FIG. 5 as a first or left controller 520a and a second or right controller 520b) that provide linked inputs to direct the operation of a controlled device 510. The first controller 520a and the second controller 520b are linked via a controller computer 535 and a supervisory computer 530 to the controlled device 510, which in one embodiment can include an aircraft 511 or a simulated aircraft. Many features of the system 500 are identified in the Figures by a reference numeral with a lower case suffix "a" or a lower case suffix "b" that identifies the feature as corresponding to the first controller 520a or the second controller 520b, respectively. These features are often referred to in the text without the suffix (for example, controllers 520) when the corresponding discussion applies to aspects of both the first controller 520a and the second controller 520b.

In one embodiment, each controller 520 includes an input device 525, such as a yoke (shown schematically in FIG. 5) and in other embodiments, the controllers 520 can include other devices, such as center sticks, side sticks, foot pedals, input keys, etc. In any of these embodiments, each controller 520 can have a neutral position (at which the controller 520 outputs a baseline signal, or no signal) and a deflected position (at which the controller outputs a signal different than the baseline signal) to control the operation of the controlled device 510.

Each controller 520 can include a force sensor 521a, 521b that detects an input force from an operator (such as a pilot) and transmits a force signal Fa, Fb. The force signals Fa, Fb are processed by the controller computer 535. Accordingly, the controller computer 535 can implement a control function 540 that produces corresponding position demand signals Da, Db. The position demand signals Da, Db direct servo motors 522a, 522b or other actuators of the controllers 520 to move the corresponding input devices 525a, 525b to positions that reflect the forces Fa, Fb applied by the pilots.

The position demand signals Da, Db can also be transmitted to the supervisory computer 530, which can include a flight control computer, a simulation computer or another computer, depending on the particular application. The supervisory computer 530 can direct a signal to the controlled device 510 to move and/or otherwise manipulate portions of the controlled device 510. Accordingly, control signals issued by the control function 540 can direct both the motion of the controllers 520 and (via the supervisory computer 530) the controlled device 510. In one embodiment, the signal used to control the controlled device 510 can correspond directly to the position demand signals Da, Db. In another embodiment, sensors are coupled to the controllers 520a, 520b and the signal used to control the controlled device 510 is transmitted by the sensors. Accordingly, if the servo motors 522a, 522b fail and/or are shut down, the feel at the controllers 520a, 520b will go limp (or provide some resistance via a mechanical return spring), but the independent sensor signals (corresponding to the actual positions of the controllers 520, 520b) will provide the input signal for the controlled device 510.

When the controlled device 510 includes the aircraft 511, the supervisory computer 530 can direct the movement of flight control surfaces, such as ailerons 514, elevators 512 and/or rudders 513. When the controlled device 510 forms part of a flight simulator, the supervisory computer 530 can direct changes in the motion of the flight simulator and/or the display presented to the pilots in the flight simulator. In either embodiment, the supervisory computer 530 can influence the activities of the control function 540. As discussed in greater detail below, the manner in which the control system response is linked can provide a versatile, realistic electronic simulation of mechanically linked controls.

Figure 6:
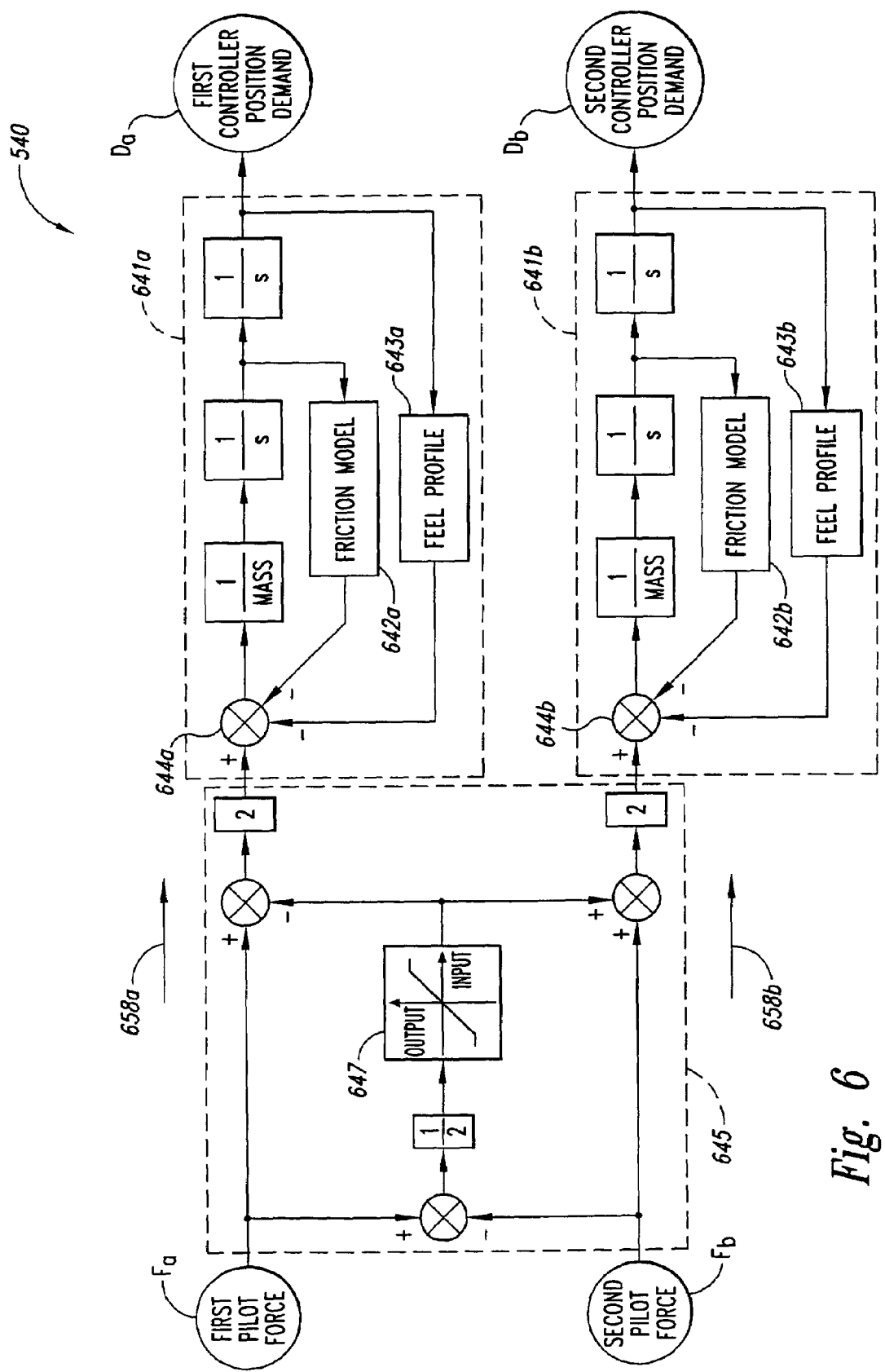
FIG. 6 schematically illustrates components of a control system in accordance with an embodiment of the invention.

FIG. 6 is a schematic illustration of components of the control function 540 described above with reference to FIG. 5. The control function 540 includes instructions that can be carried out by the controller computer 535 and can accordingly be stored in or on any computer-readable medium, such as computer memory or a removable or non-removable storage media. In one aspect of this embodiment, the control function 540 operates digitally, and in another embodiment, it operates with analog circuitry. In any of these embodiments, the control function 540 can include a linking function 645. The control function 540 receives corresponding force signals Fa, Fb, processes the signals (for example, along corresponding signal paths 658a, 658b) and outputs corresponding position demand signals Da, Db. The signal paths 658a, 658b are linked by the linking function 645 as described in greater detail below.

In one aspect of this embodiment, the linking function 645 links signals corresponding directly to the force signals Fa, Fb. For example, the linked signals can be the force signals Fa, Fb or the force signals Fa, Fb with a linear or proportional correction factor or offset. In any of these embodiments, the linked signals correspond to the input forces and can be linked by (1) subtracting one-half the difference between the first and second force signals Fa, Fb from the first force signal Fa, then doubling the result, and (b) adding one-half the difference between the force signals Fa, Fb to the second force signal Fb, then doubling the result. Accordingly, if the first pilot applies a force of 10 pounds (i.e., Fa=10) and the second pilot applied a force of 5 pounds (i.e., Fb=5), the linking function 645 transmits a signal with the value of 15 along each signal path 658a and 658b. This result simulates what each pilot would feel at the controls of a conventional, mechanically linked system. In other embodiments, the linking function 645 can link the force signals Fa, Fb in other manners, as described below with reference to FIG. 13.

Figure 1A:
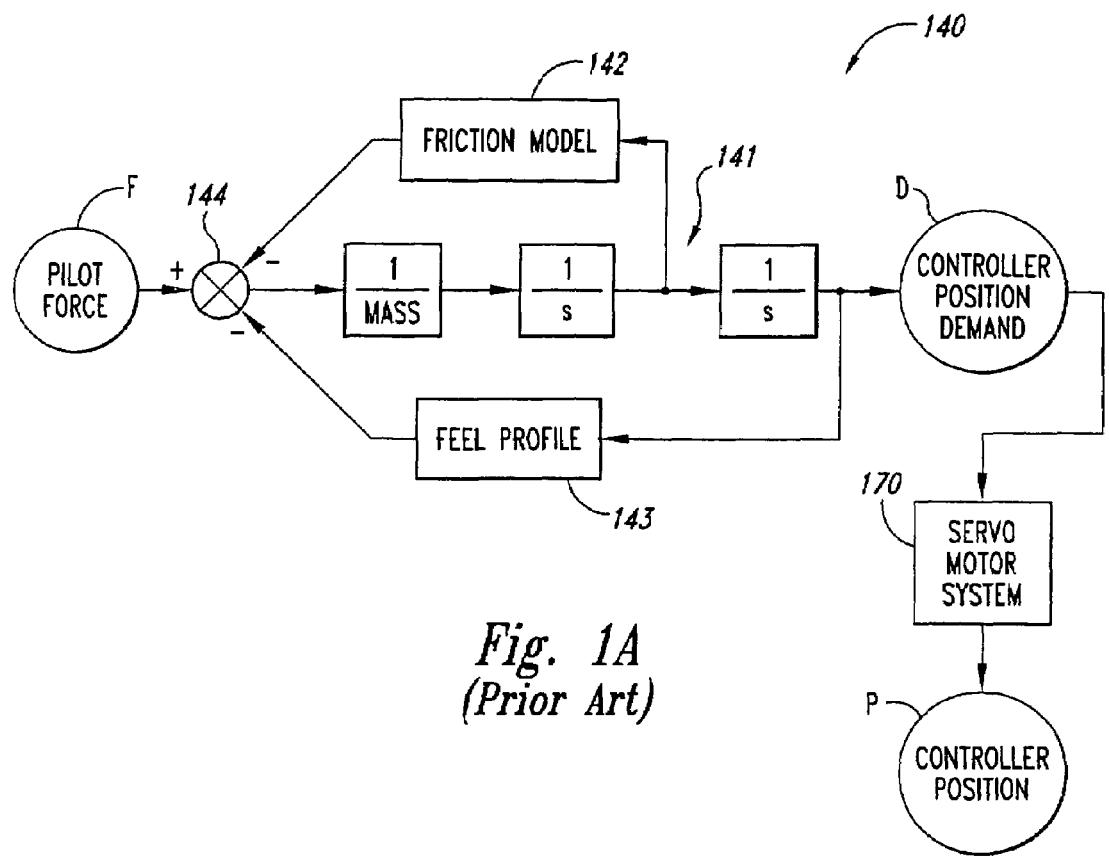
FIGS. 1A-1B illustrate a control system in accordance with the prior art.
Figure 1B:
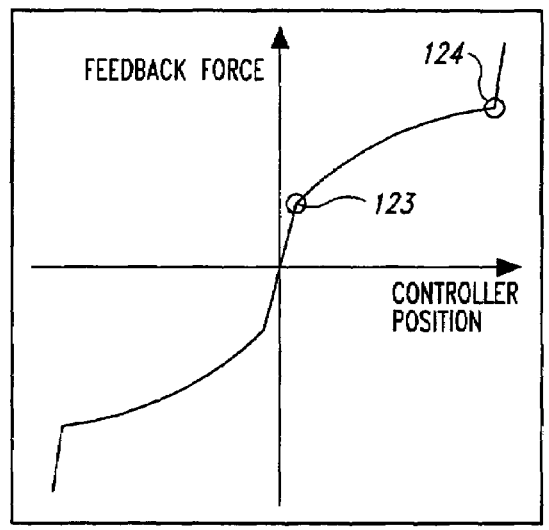
Figure 2A:
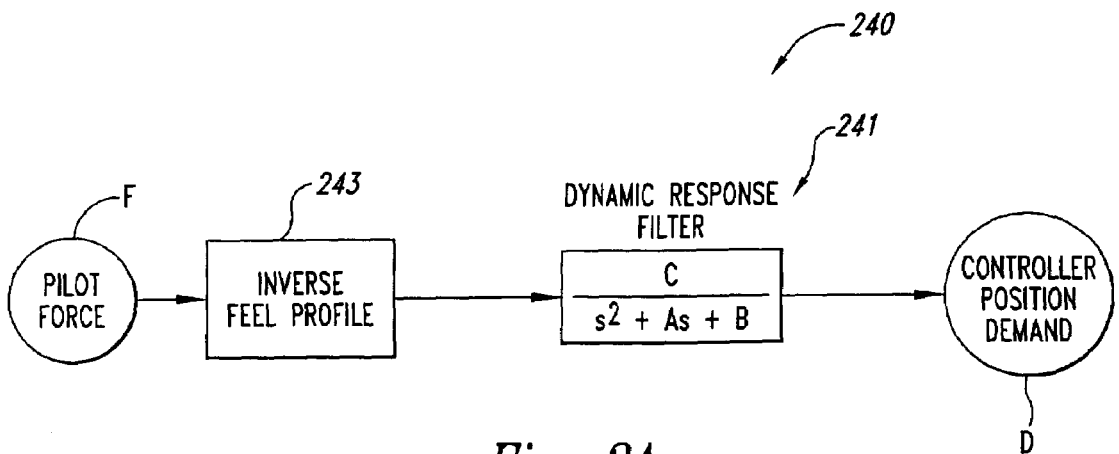
FIGS. 2A-2B illustrate a control system having a second order dynamic model in accordance with the prior art.
Figure 2B:
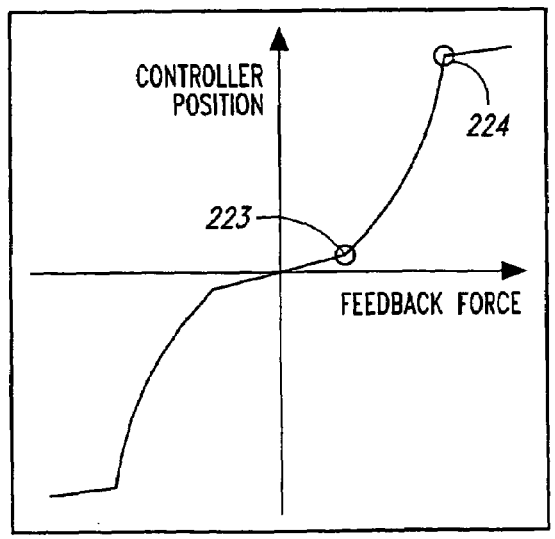

Once the force signals Fa, Fb have been linked, they can be further operated on by the control function 540 to produce the corresponding position demand signals Da, Db. For example, the control function 540 can include dynamic response models 641a, 641b that operate in a manner generally similar to the dynamic response model 141 (FIG. 1) to generate the corresponding position demand signals Da, Db. Accordingly, the response models 641a, 641b can include corresponding friction models 642a, 642b and feel profiles 643a, 643b, respectively. In other embodiments, the control function 540 can include other dynamic response models 641.

In yet another aspect of this embodiment, the linking function 645 can perform functions in addition to linking the forces F provided by the first and second pilots. For example, the linking function 645 can include a limiter 647. In one embodiment, the limiter 647 can automatically reduce the effect each pilot has on the other when the pilots provide large, opposite inputs. In one aspect of this embodiment (as indicated schematically by the graph of FIG. 6), the limiter 647 can provide an output force that (1) equals the input force when the input force is within a limit range, and (2) remains constant when the input force is outside the limit range. For example, if the limit range is set at ±10, then any pilot force in a positive direction beyond +10 will register as a force of +10, and any pilot force in a negative direction beyond −10 will register as a force of −10. If the first pilot inputs a force of +10 and the second pilot inputs a force of −10, the net resultant force along both signal paths 658a and 658b will be zero and Da and Db will both be zero (i.e., neither controller will move). If the pilots increase the input force to +15 and −15, respectively, then the resultant force along signal path 658a will be +10 and the resultant force along signal path 658b will be −10. Accordingly, the first pilot's controller will move in a positive direction and the second pilot's controller will move in a negative direction, and each pilot will no longer feel the increasing force applied by the other. Each pilots' gain appears to double, however (e.g., 1 lb above the limit range has the effect of 2 lbs below the limit range). The supervisory computer 530 (FIG. 5) can then determine what signal is sent to the controlled device 510. The foregoing arrangement will also provide relief for one pilot if the other pilot's controller jams. In other embodiments, the output value of the force that is outside the limit range can be discounted in manners other than making it constant.

In a further aspect of this embodiment, the linking function 645 can more accurately simulate the situation that arises when one of the pilots has exceeded a breakout force before the other. The breakout force refers to the minimum or threshold force necessary to be applied to the controller 520a, 520b (FIG. 5) before the control function 540 directs a change in the corresponding controller position demand signal Da, Db. When this situation arises in a mechanically linked system, and the first pilot has already applied to the first controller 520a a force at least equal the breakout force, the second pilot need not exceed the breakout force when he or she seizes the second controller 520b. The linking function 645 can simulate this response by determining whether one of the pilots has exceeded the breakout force and, if so, the position of the controllers 520a, 520b for both the first and second pilots is independent of whether or not the second pilot has also exceeded the breakout force. For example, if the breakout force is 5 and the first pilot applies a force of 10 while the second pilot applied a force of 2, both controller position demand signals Da and Db will correspond to an input force of 12, even through only one pilot has exceeded the breakout force.

Figure 7:
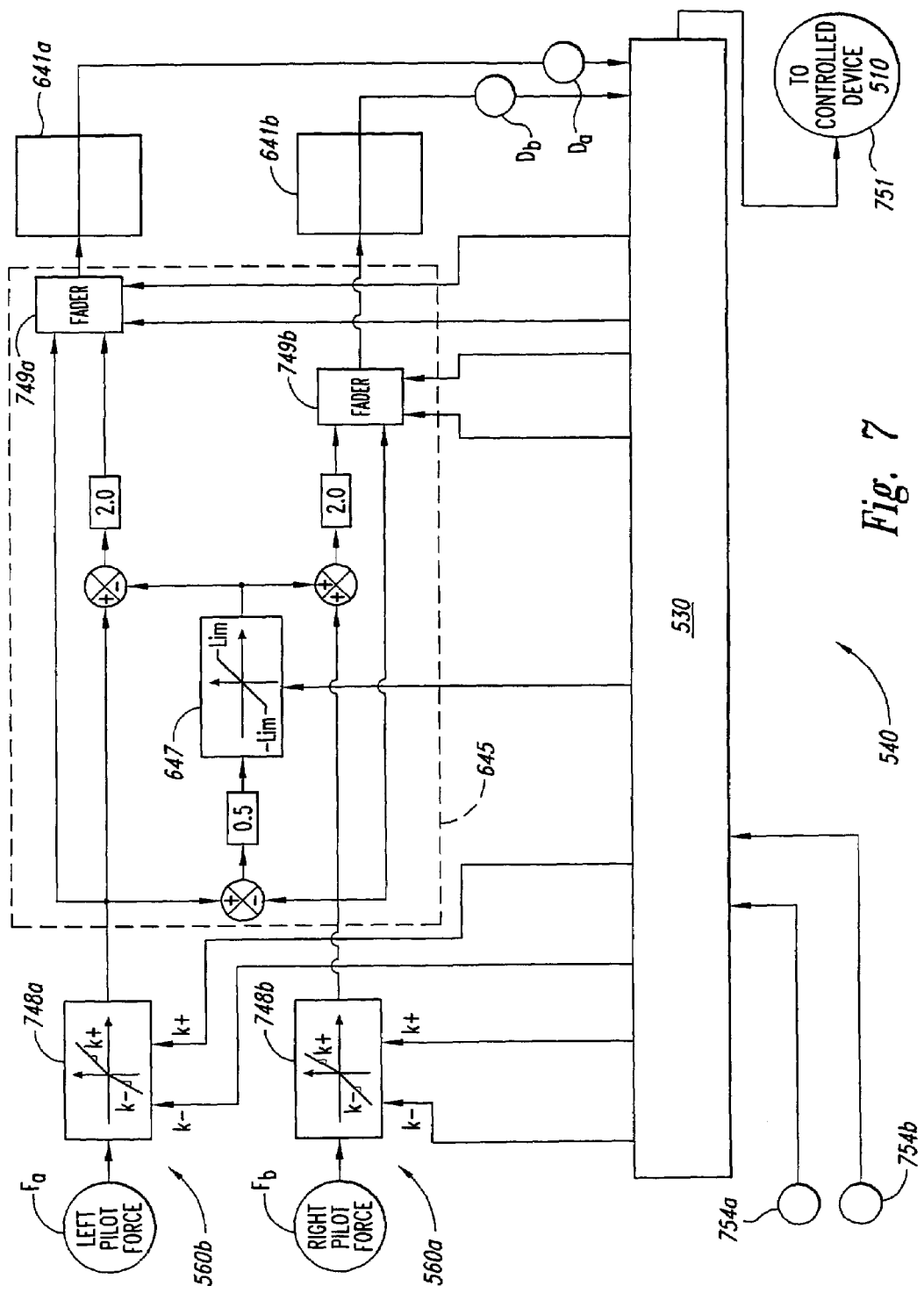
FIG. 7 illustrates further details of components of a control system in accordance with an embodiment of the invention shown in FIG. 6.

FIG. 7 is a schematic illustration of the control function 540 described above with reference to FIGS. 5 and 6, showing additional features in accordance with further aspects of this embodiment. For example, the control function 540 can include force normalizers 748a, 748b that account for different response characteristics for the first and second controllers, such as different response characteristics for sticks located on the left and right side of an aircraft. The control function 540 can also include left and right faders 749a, 749b that smooth the transition from linked to unlinked controls and back again.

In one aspect of this embodiment, the supervisory computer 530 can coordinate and integrate the actions and responses of the control function 540. For example, the supervisory computer 530 can provide the appropriate inputs to the force normalizers 748. The supervisory computer 530 can control the faders 749 to guide the phase-in and phase-out of the link between the two controls. The supervisory computer 530 can also receive takeover input signals 754a, 754b which provide for either pilot taking over the controls of the system upon activating the appropriate takeover push button. In another aspect of this embodiment, the supervisory computer 530 can also consolidate the first and second controller position demand signals Da, Db to provide a controlled device signal 751 that is directed to the controlled device 510 (FIG. 5.) When the controlled device 510 includes an aircraft, the controlled device signal 751 can be directed to a control surface servo actuator or other active device.

One feature of an embodiment of the system 500 described above with reference to FIGS. 5-7 is that the linking function 645 can more closely match the characteristics of conventional mechanical systems than can existing arrangements. For example, the behavior of an embodiment of the system 500 can more closely match the behavior of a mechanical system when one controller is jammed, when one controller has not yet exceeded a breakout force, and/or when the controllers receive large, oppositely directed inputs. An advantage of this feature is that pilots or other operators who are familiar with the characteristics of mechanical systems may find more commonality between those systems and systems configured in accordance with embodiments of the present invention.

Figure 3:
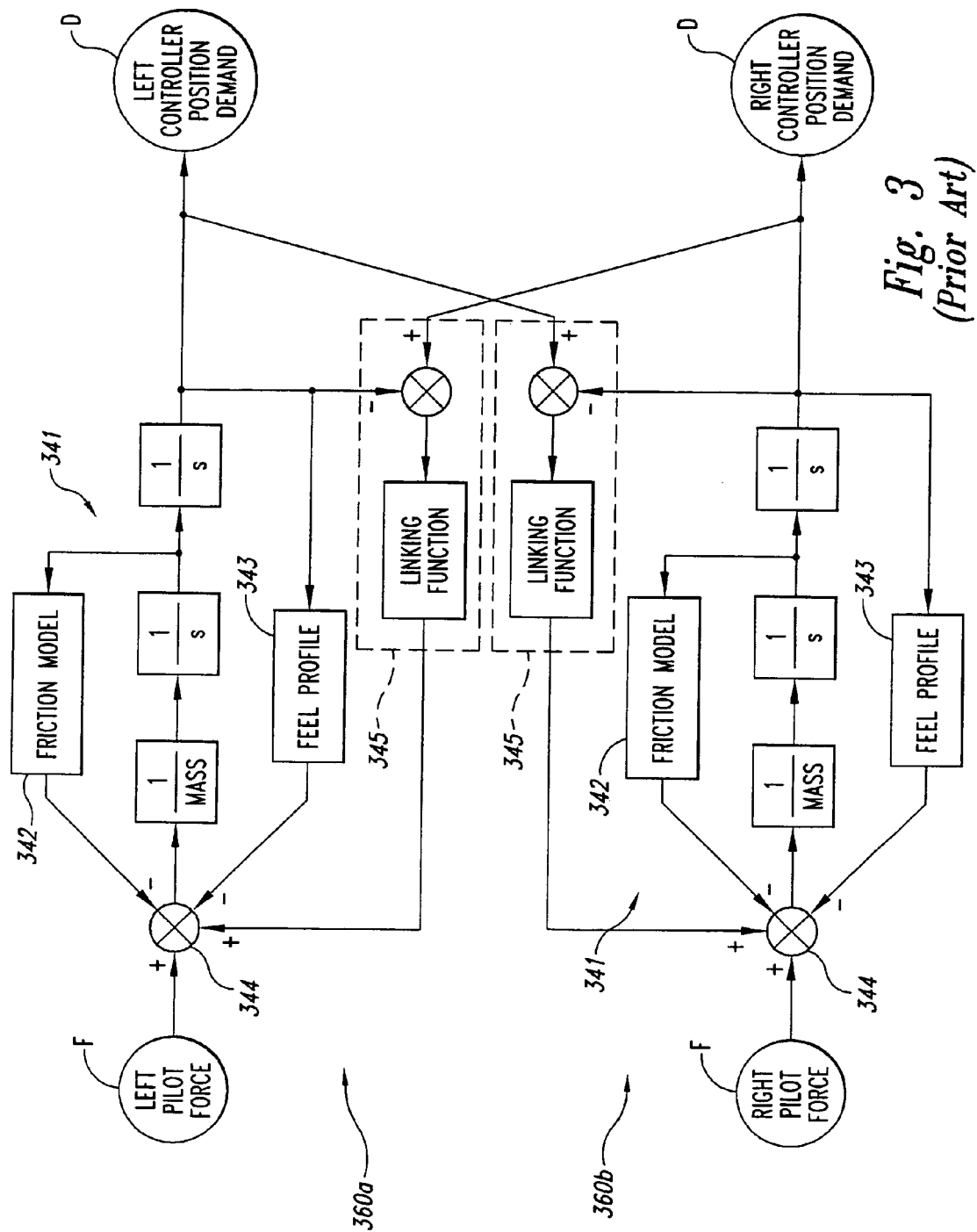
FIG. 3 illustrates a control system arrangement linked in accordance with the prior art.
Figure 4:
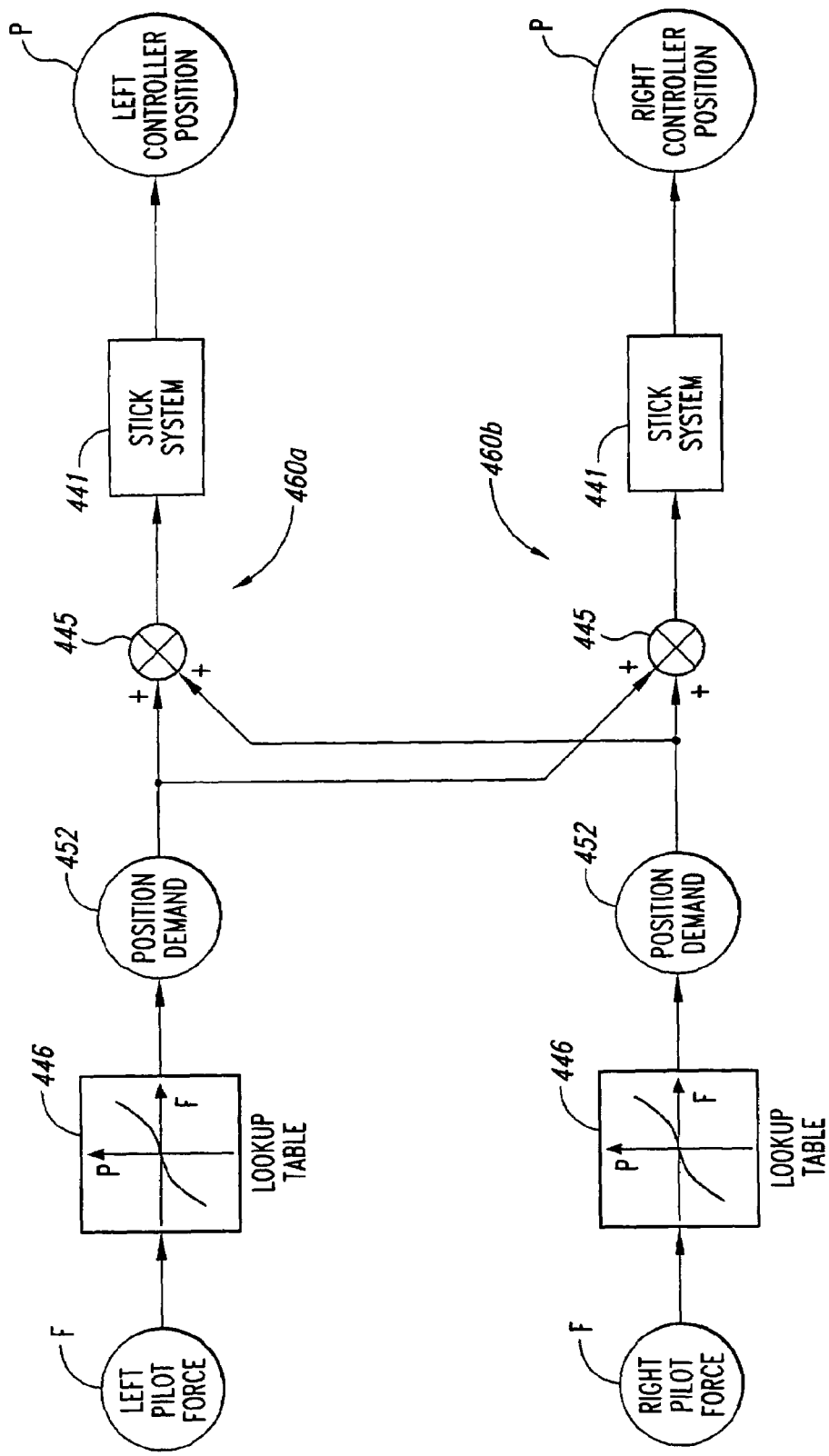
FIG. 4 illustrates another control system arrangement linked in accordance with the prior art.

Another feature of an embodiment of the system 500 described above with reference to FIGS. 5-7 is that the signals generated by each controller are linked prior to calculating the target position of each controller. An advantage of this arrangement is that the linking function can be installed, implemented, updated, changed and/or otherwise manipulated without disturbing the function or module that determines the controller position based on input force. This is unlike existing systems (such as those described above with reference to FIGS. 3 and 4) for which the link between first and second controllers is integrated with the calculation of controller position.

FIGS. 8-12 are block diagrams illustrating processes or methods that can be performed with the control function 540 described above with reference to FIGS. 5-7 in accordance with various embodiments of the invention. Referring first to FIG. 8, a process 800 in accordance with one embodiment can include linking force signals to move the first and second controllers and to direct a combined control signal to the controlled device. For example, the method 800 can include receiving a first force signal corresponding directly to a first force applied to the first controller (process portion 801). The process can further include receiving a second force signal corresponding directly to a second force applied to the second controller (process portion 802), then linking the first force signal and the second force signal (process portion 803). After linking the first and second force signals, the process 800 can further include directing the first position demand signal to the first controller (for example, via a servo motor of the first controller) to move the first controller to a first controller position displaced from a first neutral position by a first distance (process portion 804). The process 800 can further include directing a second position demand signal to the second controller to move the second controller to a second controller position displaced from a second neutral position by a second distance at least approximately equal to the first distance (process portion 805). Accordingly, both the first and second controllers are moved approximately the same distance from their neutral positions. The process can still further include directing a control signal to a controlled device based on at least one of the first and second force signals (process portion 806).

In one aspect of an embodiment described above with reference to FIG. 8, the linked signals correspond identically to the first and second force signals. In other embodiments, the linked signals can have values that correspond directly to the first and second force signals in other manners. For example, the linked signals may be directly proportional to and/or linearly related to the first and second force signals. In either embodiment, the signals are linked prior to determining the corresponding controller positions. For example, as shown in FIG. 6, the signals are linked after determining whether corresponding force limits have been exceeded. In other embodiments, the link between the two signal paths can occur at other points along the paths, so long as the link occurs prior to determining the controller position demand. For example, as shown in FIG. 9, a process 900 can include receiving a first force signal corresponding to a first force applied to the first controller (process portion 901) and receiving a second force signal corresponding to a second force applied to the second controller (process portion 902). The process 900 can further include directing a first position demand signal to the first controller to move the first controller from the first neutral position to the first controller position, with the first force signal and the first position demand signal defining a first signal path (process portion 903). A second position demand signal is directed to the second controller to move the second controller from the second neutral position to the second controller position, with the second force signal and the second position demand signal defining a second signal path (process portion 904). A control signal is then directed to the controlled device based on at least one of the first and second force signals (process portion 905), and the first and second signal paths are linked at a point where the signals on the first and second signal paths correspond to a quantity other than a position of one of the controllers (process portion 906).

Figure 10:
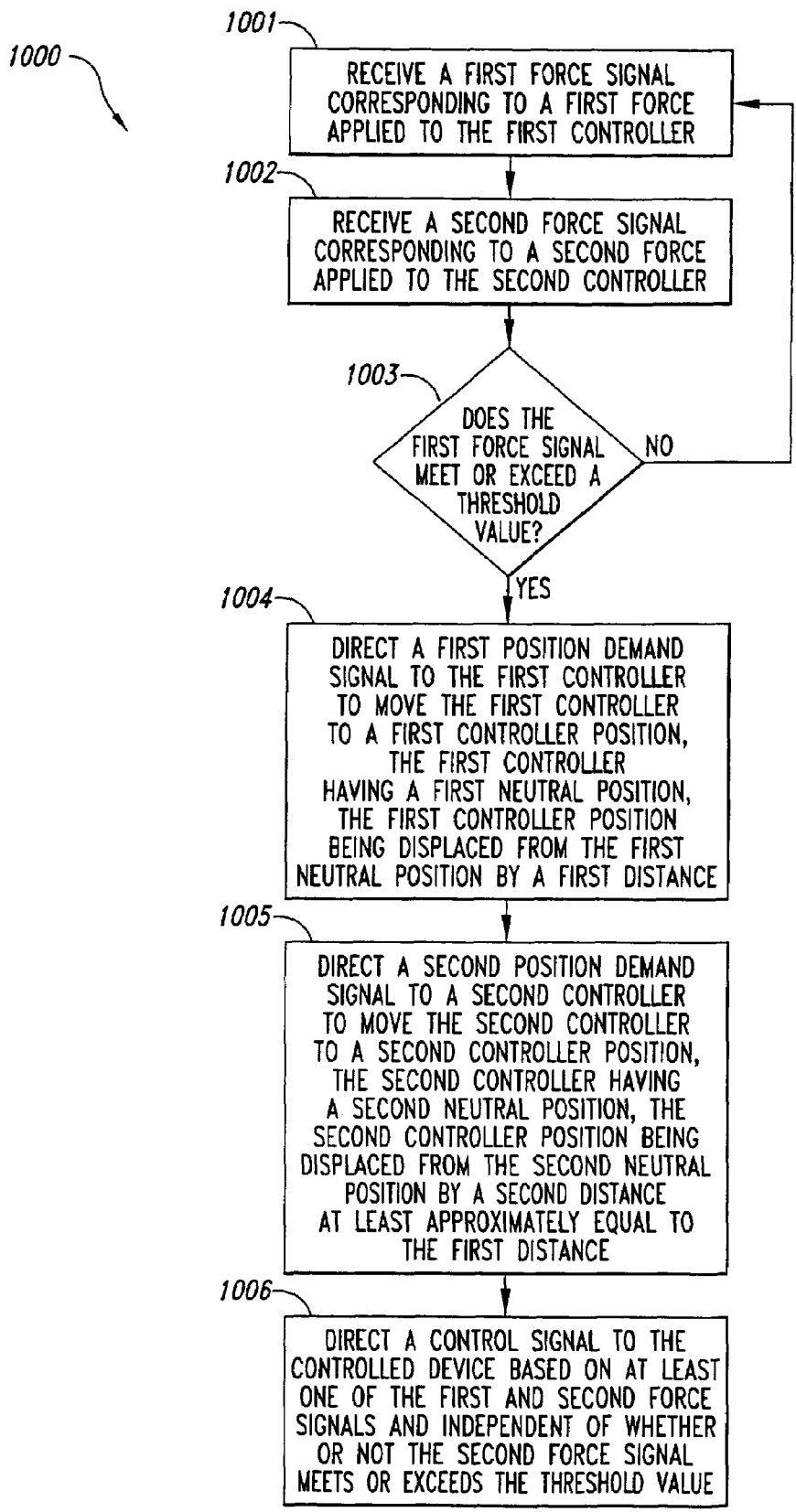
FIG. 10 is a block diagram illustrating a method in accordance with yet another embodiment of the invention.

In another embodiment, shown in a block diagram in FIG. 10, a process 1000 can include accounting for one of the force inputs exceeding a breakout force while another input force does not. For example, the process 1000 can include receiving a first force signal corresponding to a first force applied to the first controller (process portion 1001), and receiving a second force signal corresponding to a second force applied to the second controller (process portion 1002). A determination is made as to whether the first force signal meets or exceeds a threshold value (process portion 1003). If it does, then a first position demand signal is directed to the first controller to move the first controller from its neutral position to its first controller position (process portion 1004). A second position signal is directed to the second controller to move the second controller by about the same distance (process portion 1005). In process portion 1006, a control signal is directed to the controlled device based on at least one of the first and second force signals and is independent of whether or not the second force signal meets or exceeds the threshold value.

Figures 11, 12:
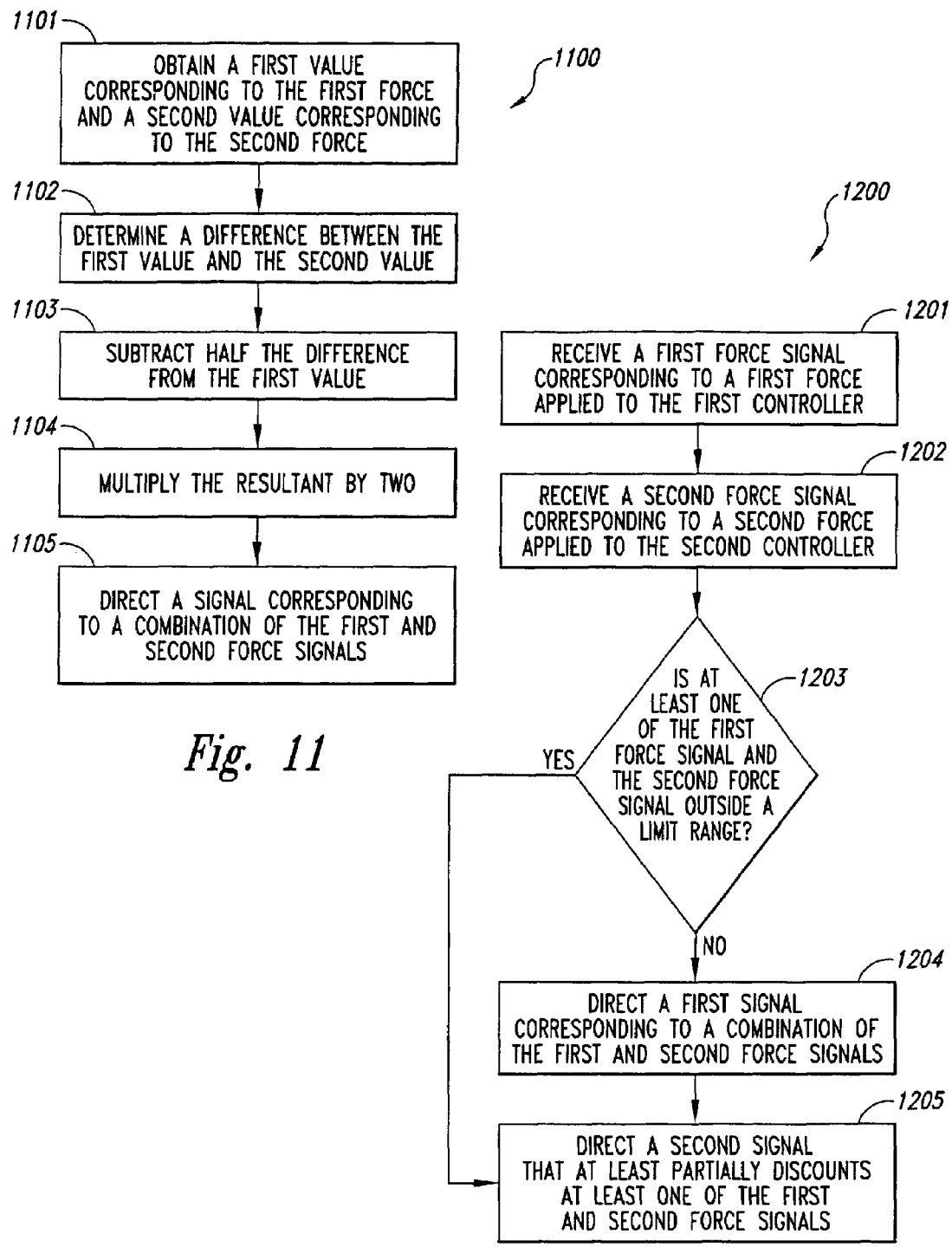
FIG. 11 is a block diagram illustrating a method in accordance with still another embodiment of the invention.
FIG. 12 is a block diagram illustrating a method in accordance with yet another embodiment of the invention.

FIG. 11 is a block diagram illustrating a process 1100 for linking first and second force signals in accordance with another embodiment of the invention. In process portion 1101, a first value corresponding to the first force and a second value corresponding to the second force are obtained. In process portion 1102, the difference between the first value and the second value are determined. In process portion 1103, one-half the difference between the first value and the second value are subtracted from the first value and the resultant is multiplied by two (process portion 1104). In process portion 1105, a signal corresponding to a combination of the first and second force signals is directed.

FIG. 12 is a block diagram illustrating a process 1200 that can account for large opposite input forces, controller jams and/or other instances in which one controller input is defective or is to be ignored. In process portion 1201 a first force signal corresponding to a first force applied to a first controller is received, and in process portion 1202, a second force signal corresponding to a second force applied to a second controller is received. In process portion 1203, a determination is made as to whether at least one of the first force signal and the second force signal is outside a limit range. If not, then in process portion 1204, a first signal corresponding to a combination of the first and second force signals is directed. If so, a second signal that at least partially discounts at least one of the first and second force signals is directed (process portion 1205).

Figure 13:
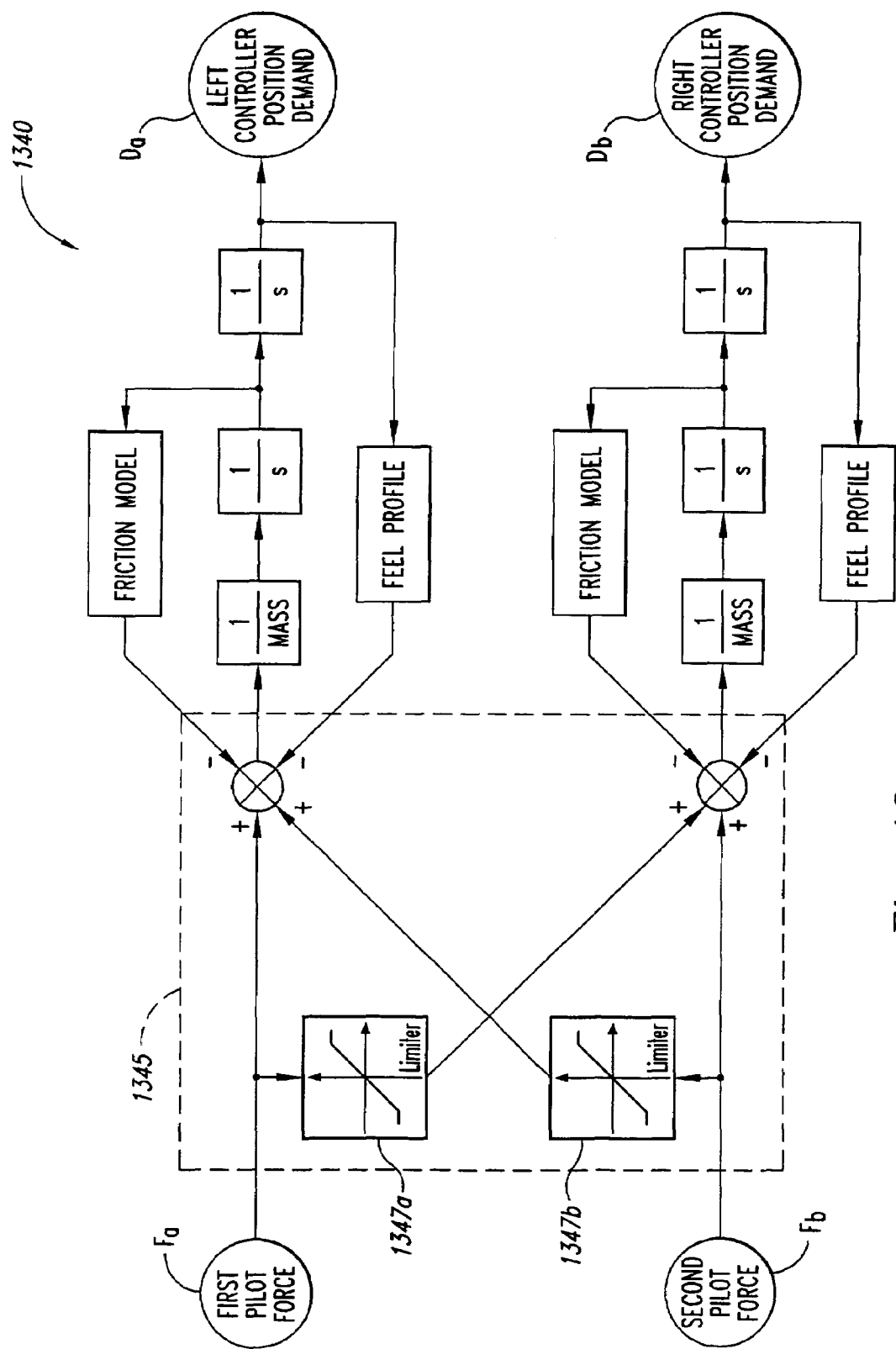
FIG. 13 is a schematic illustration of components of a system in accordance with another embodiment of the invention.

FIG. 13 is a partially schematic illustration of a system 1340 that receives first and second pilot force input signals Fa and Fb and outputs first and second controller position demands Da and Db in accordance with another embodiment of the invention. In one aspect of this embodiment, the system 1340 includes a linking function 1345 that has two limit models 1347a and 1347b. The limit models 1347a and 1347b are coupled in the linking function 1345 such that each pilot feels the sum of the two input forces before the override limit is reached, and each pilot does not feel an effect of the other pilot's increasing input force after the limit is reached. For example, if the pilot's input forces are +15 and −15, respectively, and the limit range is ±10, then the first pilot will generate a net force signal of +5 and the second pilot will generate a net force signal of −5.

From the foregoing, it will be appreciated that specific embodiments of the invention have been described herein for purposes of illustration, but that various modifications may be made without deviating from the spirit and scope of the invention. For example, steps or processes performed by particular modules on particular computers in some embodiments may be performed by other modules and/or other computers in other embodiments. Control modules may operate from the same system (as shown in FIG. 5) or different control systems. Functions provided by the controller computer 535 and the supervisory computer 530 may be combined in a single computer. Accordingly, the invention is not limited except as by the appended claims.

We claim:

1. A computer-implemented method for linking input control signals, comprising:
    receiving a first force signal corresponding to a first force applied to a first aircraft controller;
    receiving a second force signal corresponding to a second force applied to a second aircraft controller; and
    linking the first force signal and the second force signal by performing the following functions:
        if a difference between the first force signal and the second force signal is within a selected limit range, directing a first control signal corresponding to a combination of the first and second force signals; and
        if the difference between the first force signal and the second force signal is outside the selected limit range, directing a second control signal that at least partially discounts the first force signal.

2. The method of claim 1, further comprising if the first force signal meets or exceeds a threshold value, directing a first position demand signal to the first controller to move the first controller to a first controller position, and directing a second position demand signal to the second controller to move the second controller to a second controller position independent of whether or not the second force signal meets or exceeds the threshold value, the first controller having a first neutral position, the first controller position being displaced from the first neutral position by a first distance, the second controller having a second neutral position, the second controller position being displaced from the second neutral position by a second distance at least approximately equal to the first distance.

3. The method of claim 1 wherein the first and second force signals indicate forces in at least approximately the same direction, and wherein directing the second control signal includes basing the second control signal on a constant value for the first force signal.

4. The method of claim 1 wherein directing the first and second control signals includes directing the control signals to an actuator operatively coupled to an aircraft flight control surface.

5. The method of claim 1, wherein linking the first force signal and the second force signal includes summing a first value corresponding at least in part to the first force and a second value corresponding at least in part to the second force.

6. The method of claim 1, wherein linking the first force signal and the second force signal includes combining a first value corresponding to the first force and a second value corresponding to the second force by:
    determining a difference between the first value and the second value; and
    subtracting half the difference from the first value and multiplying the resultant by two.

7. The method of claim 1, wherein linking the first force signal and the second force signal includes combining a first value corresponding to the first force and a second value corresponding to the second force by:
    determining a difference between the first value and the second value; and
    adding half the difference to the second value and multiplying the resultant by two.

8. The method of claim 1, further comprising directing the first control signal to a controllable device of an aircraft.

9. The method of claim 1, further comprising directing the first control signal to an actuator operatively coupled to at least one of an aircraft pitch control surface, an aircraft yaw control surface and an aircraft roll control surface.

10. The method of claim 1 wherein receiving the first force signal includes receiving the first force signal from a transducer operatively coupled to a movable aircraft control stick.

11. The method of claim 1 wherein the first controller includes a control stick operatively coupled to a transducer and a motor, further wherein receiving the first force signal includes receiving the first force signal from the transducer, and wherein directing the first and second control signals includes directing first and second position signals to the motor to move the first controller to corresponding first and second positions.

12. A computer-implemented method for linking signals from a first aircraft controller having a first neutral position and a second aircraft controller having a second neutral position, the method comprising:
    receiving a first force signal corresponding to a first force applied to the first aircraft controller;
    receiving a second force signal corresponding to a second force applied to the second aircraft controller; and
    linking the first force signal and the second force signal by performing the following functions:
        if a difference between the first force signal and the second force signal is within a selected limit range, directing a first control signal to control a state of a flight control surface, the first control signal corresponding to a combination of the first and second force signals; and
        if the first force signal is outside the selected limit range, directing a second control signal to control a state of a flight control surface, the second control signal at least partially discounting the first force signal.

13. The method of claim 12, further comprising:
if the first force signal meets or exceeds a threshold value, directing a first position demand signal to the first controller to move the first controller to a first controller position independent of whether or not the second force signal meets or exceeds the threshold value; and
directing a second position demand signal to the second controller to move the second controller to a second controller position, the first controller having a first neutral position, the first controller position being displaced from the first neutral position by a first distance, the second controller having a second neutral position, the second controller position being displaced from the second neutral position by a second distance at least approximately equal to the first distance.

14. The method of claim 12 wherein directing the first control signal includes directing a control signal based on a sum of the first and second values.

15. The method of claim 12 wherein linking the first force signal and the second force signal includes:
determining a difference between the first value and the second value; and
subtracting half the difference from the first value and multiplying the resultant by two.

16. The method of claim 12 wherein linking the first force signal and the second force signal includes:
determining a difference between the first value and the second value; and
adding half the difference to the second value and multiplying the resultant by two.

17. The method of claim 12, further comprising normalizing the first force signal by applying a correction factor to the first force signal if the first force signal corresponds to a selected force direction.

18. The method of claim 12, further comprising directing the first control signal to an actuator operatively coupled to at least one of an aircraft pitch control surface, an aircraft yaw control surface and an aircraft roll control surface.

19. The method of claim 12 wherein receiving the first force signal includes receiving the first force signal from a transducer operatively coupled to a movable aircraft control stick.

20. The method of claim 12 wherein the first controller includes a control stick operatively coupled to a transducer and a motor, further wherein receiving the first force signal includes receiving the first force signal from the transducer, and wherein the method further comprises directing a motion signal to the motor to move the first controller to a selected position.

21. A computer-implemented method for linking signals from a first aircraft controller having a first neutral position and a second aircraft controller having a second neutral position, the method comprising:
receiving a first force signal corresponding to a first force applied to the first aircraft controller;
if the first force signal exceeds a threshold value, directing a first position demand signal to the first aircraft controller to move the first aircraft controller to a first controller position and directing a second position demand signal to a second controller to move the second aircraft controller to a second controller position, the first controller position being displaced from the first neutral position by a first distance, the second controller position being displaced from the second neutral position by a second distance at least approximately equal to the first distance;
receiving a second force signal corresponding to a second force applied to the second aircraft controller; and
linking the first and second force signals by performing the following functions:
if a difference between the first force signal and the second force signal is within a selected limit range, directing a first control signal to control a state of a flight control surface, the first control signal corresponding to a combination of the first and second force signals and being independent of whether or not the second force signal exceeds the threshold value; and
if the difference between the first force signal and the second force signal is outside the selected limit range, directing a second control signal to control the state of the flight control surface, the second control signal at least partially discounting the first force signal.

22. The method of claim 21, wherein linking the first and second force signals include:
determining a difference between the first value and the second value; and
subtracting half the difference from the first value and multiplying the resultant by two.

23. The method of claim 21, further comprising directing the control signal to an actuator operatively coupled to at least one of an aircraft pitch control surface, an aircraft yaw control surface and an aircraft roll control surface.

24. The method of claim 21 wherein the first and second force signals indicate forces in at least approximately opposite directions, and wherein at least partially discounting at least one of the first and second force signals includes setting the at least one force signal to a constant value.

25. The method of claim 21 wherein at least partially discounting at least one of the first and second force signals includes at least partially discounting both the first and second force signals.

26. A computer-readable medium the contents of which cause a computer to perform a method for linking signals from a first aircraft controller having a first neutral position and a second aircraft controller having a second neutral position, the method comprising:
receiving a first force signal corresponding to a first force applied to the first aircraft controller;
receiving a second force signal corresponding to a second force applied to the second aircraft controller;
if the first force signal exceeds a threshold value, directing a first position demand signal to the first aircraft controller to move the first aircraft controller to a first controller position and directing a second position demand signal to a second controller to move the second aircraft controller to a second controller position, the first controller position being displaced from the first neutral position by a first distance, the second controller position being displaced from the second neutral position by a second distance at least approximately equal to the first distance; and
linking the first force signal and the second force signal by performing the following functions:
if a difference between the first force signal and the second force signal is within a selected limit range, directing a control signal to control a state of a flight control surface, the first control signal corresponding to a combination of the first and second force signals and being independent of whether or not the second force signal exceeds the threshold value; and
if the difference between the first force signal and the second force signal is outside the selected limit range, directing a second control signal to control the state of the flight control surface, the second control signal at least partially discounting the first force signal.

27. The computer-readable medium of claim 26, wherein the method comprises:
if the first force signal meets or exceeds a threshold value, directing a first position demand signal to the first controller to move the first controller to a first controller position, and directing a second position demand signal to the second controller to move the second controller to a second controller position, the first controller having a first neutral position, the first controller position being displaced from the first neutral position by a first distance, the second controller having a second neutral position, the second controller position being displaced from the second neutral position by a second distance at least approximately equal to the first distance; and
directing the first control signal independent of whether or not the second force signal meets or exceeds the threshold value.

28. The computer-readable medium of claim 26 wherein the first and second force signals indicate forces in at least approximately the same direction and wherein at least partially discounting at least one of the first and second force signals includes selecting the at least one force to have a constant value.

29. The computer-readable medium of claim 26 wherein the first and second force signals indicate forces in at least approximately opposite directions, and wherein at least partially discounting at least one of the first and second force signals includes selecting the at least one force to have a constant value.

30. The computer-readable medium of claim 26 wherein at least partially discounting at least one of the first and second force signals includes at least partially discounting both the first and second force signals.

31. The computer-readable medium of claim 26, wherein the method further comprises directing the first control signal to an actuator operatively coupled to at least one of an aircraft pitch control surface, an aircraft yaw control surface and an aircraft roll control surface.

32. The computer-readable medium of claim 26 wherein receiving the first force signal includes receiving the first force signal from a transducer operatively coupled to a movable aircraft control stick.

33. The computer-readable medium of claim 26 wherein the first controller includes a control stick operatively coupled to a transducer and a motor, further wherein receiving the first force signal includes receiving the first force signal from the transducer, and wherein the method further comprises directing a motion signal to the motor to move the first controller to a selected position.

34. A system for controlling an aircraft flight control surface, comprising:
a first aircraft controller having a first input device configured to receive a first operator's input command, the first input device being coupled to a first sensor to sense a force applied to the first input device, the first input device being coupled to a first motor to move the first input device from a first neutral position;
a second aircraft controller having a second input device configured to receive a second operator's input command, the second input device being coupled to a second sensor to sense a force applied to the second input device, the second input device being coupled to a second motor to move the second input device from a second neutral position; and
a computer-readable medium operatively coupled to the first and second aircraft controllers, the computer-readable medium being configured to:
receive a first force signal corresponding to a first force applied to the first aircraft controller;
receive a second force signal corresponding to a second force applied to the second aircraft controller; and
link the first and second force signals by performing the following functions:
if a difference between the first force signal and the second force signal is within a selected limit range, direct a first control signal to control a state of the aircraft flight control surface, the first control signal corresponding to a combination of the first and second force signals; and
if a difference between the first force signal and the second force signal is outside the selected limit range, direct a second control signal to control a state of the aircraft flight control surface, the second control signal at least partially discounting the first force signal.

35. The system of claim 34, wherein the computer-readable medium is configured to:
determine if the first force signal meets or exceeds a threshold value;
if the first force signal meets or exceeds a threshold value, direct a first position signal to the first controller to move the first controller to a first controller position, and direct a second position signal to the second controller to move the second controller to a second controller position, the first controller having a first neutral position, the first controller position being displaced from the first neutral position by a first distance, the second controller having a second neutral position, the second controller position being displaced from the second neutral position by a second distance at least approximately equal to the first distance; and
direct the first control signal independent of whether or not the second force signal meets or exceeds the threshold value.

* * * * *

UNITED STATES PATENT AND TRADEMARK OFFICE
CERTIFICATE OF CORRECTION

PATENT NO. : 7,474,944 B2  Page 1 of 1
APPLICATION NO. : 11/099684
DATED : January 6, 2009
INVENTOR(S) : Daniel H. Cartmell et al.

It is certified that error appears in the above-identified patent and that said Letters Patent is hereby corrected as shown below:

In column 5, line 40, delete "658aand" and insert -- 658a and --, therefor.

In column 13, line 23, in claim 28, delete "direction" and insert -- direction, --, therefor.

Signed and Sealed this

Thirteenth Day of July, 2010

David J. Kappos
*Director of the United States Patent and Trademark Office*